Sept. 20, 1938.　　　　B. D. BEDFORD　　　　2,130,412
ELECTRIC CONTROL AND INDICATING CIRCUITS
Original Filed Jan. 30, 1936
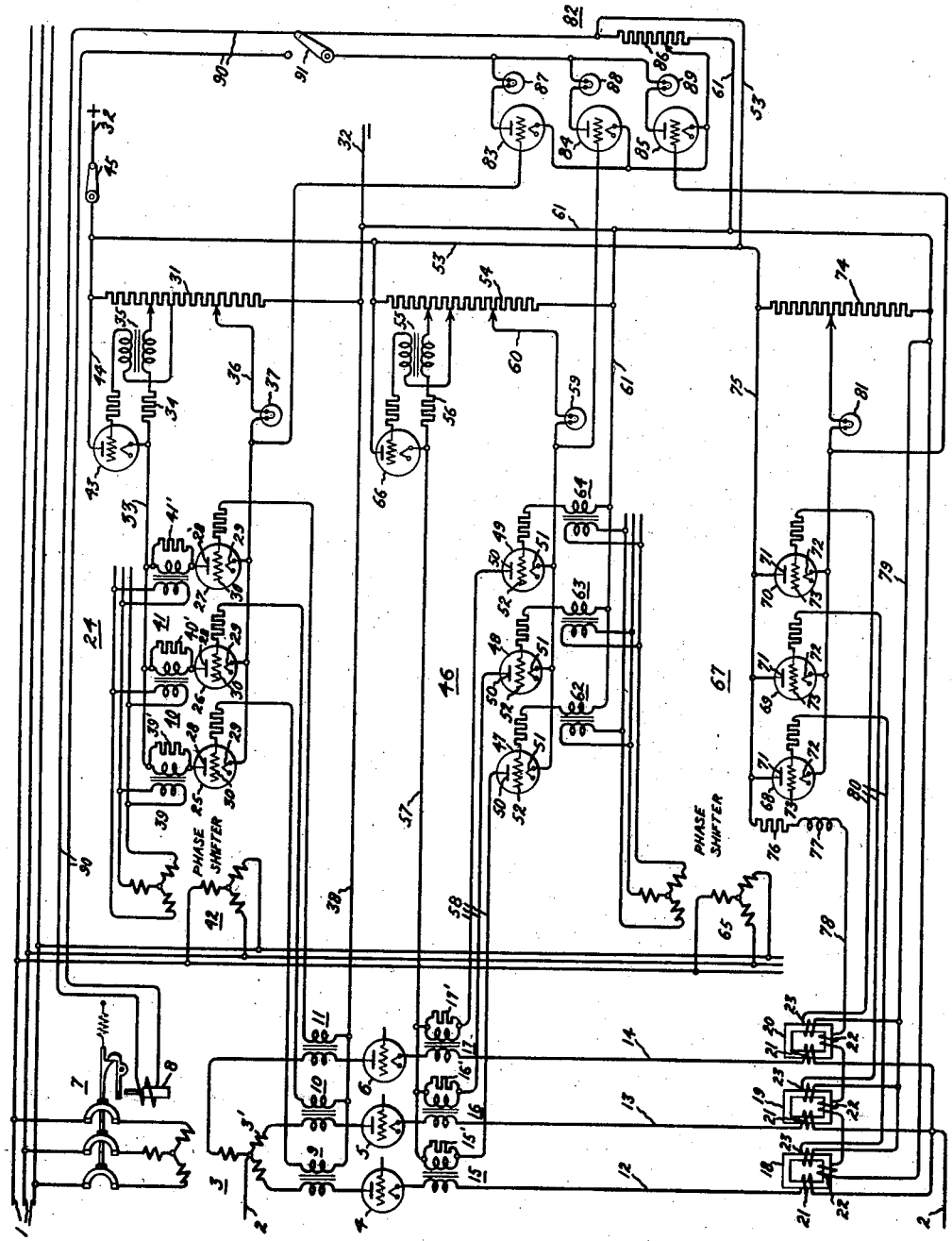
Inventor:
Burnice D. Bedford,
by Harry E. Dunham
His Attorney.

Patented Sept. 20, 1938

2,130,412

UNITED STATES PATENT OFFICE 2,130,412

ELECTRIC CONTROL AND INDICATING CIRCUITS

Burnice D. Bedford, Schenectady, N. Y., assignor to General Electric Company, a corporation of New York Original application January 30, 1936, Serial No. 61,528. Divided and this application March 26, 1937, Serial No. 133,233

10 Claims. (Cl. 177—311)

My invention relates to electric circuits and more particularly to indicating and control systems for electric valve circuits.

This application is a division of my copending application Serial No. 61,528, entitled Electric control and indicating circuits, filed January 30, 1936, and assigned to the assignee of the present application.

Where a plurality of elements in mechanical and electrical systems are intended to operate in a predetermined mode or in accordance with certain operating conditions, it is sometimes desirable to provide electric signaling systems to afford an indication when the elements depart from a predetermined mode of operation and to afford an indication of the nature of the irregular operation which has occurred. In electric translating circuits which employ electric valves, it is desirable in many instances to provide auxiliary control and indicating systems to indicate a condition of operation of the electric translating circuit. Particularly in power systems where electrical energy is transmitted by means of electric valves, it is frequently desirable to provide indicating systems or control systems which are responsive to abnormal operation of the electric system to control the system in response to such irregular operation, or to provide an indication when the system has departed from a predetermined mode of operation. It is desirable that these control and indicating systems be inherently capable of precisely and accurately responding to predetermined operating conditions and it is also desirable that these circuits be readily adaptable to electric translating systems generally, without necessitating material change or alteration in the apparatus employed in the electric system and without interfering with the manner in which the systems operate.

An object of my invention is to provide improved control and indicating systems for electric valve translating circuits which function in response to a departure from a predetermined mode or manner of operation of the translating circuit.

Another object of my invention is to provide a control and indicating circuit for electric valve translating apparatus which functions to control an associated circuit or to afford an indication when the electric valves of the translating circuit fail to conduct current during predetermined intervals, or fail to become conductive at predetermined instants in the cycle of operation.

In accordance with the illustrated embodiment of my invention a control and indicating system is provided for electric valve translating circuits.

at any time other than during predetermined intervals or to afford an indication when the valves begin to conduct at instants other than predetermined instants in the cycle of operation. The control and indicating system also may comprise a circuit to indicate which electric valve of a plurality of electric valves is the first to fail to conduct within a predetermined interval or period, or to indicate the first valve which fails to become conductive at predetermined instants in the cycle of operation. A reverse current or arc-back indicating circuit is also included in the system to indicate which valve of a plurality of electric valves has been the first to experience a reverse current or arc-back condition. To provide a means for indicating which of the above types of irregular or abnormal operation has been the first to occur, an additional indicating circuit is provided to be responsive to and to indicate which of the above mentioned indicating circuits has been the first to respond to irregular operation.

For a better understanding of my invention, together with other and further objects thereof, reference may be had to the following description taken in connection with the accompanying drawing, and its scope will be pointed out in the appended claims.

Referring now to the single figure of the drawing, which is a diagrammatic representation of an embodiment of my invention as applied to an electric valve translating system for transmitting energy between a three phase alternating current circuit and a direct current load circuit. Electrical energy is transmitted from a three phase alternating current circuit 1 to the direct current load circuit 2 through a transformer 3 and main or power electric valves 4, 5, and 6. Connected in series with the transformer 3 is a circuit interrupter 7 having an electroresponsive actuating element 8. Secondary windings 3' of the transformer 3 are connected to the electric valves 4, 5, and 6 through current responsive means, such as transformers 9, 10, and 11. By means of conductors 12, 13, and 14 current responsive means, such as current transformers 15, 16, and 17, are connected in series with current directional means such as saturable reactors 18, 19, and 20, all of which are connected in series with electric valves 4, 5, and 6, respectively. The saturable reactors 18, 19, and 20 are each provided with a series winding 21, a unidirectional saturating winding 22 and a current direction responsive winding 23.

To provide means for indicating which electric valve of valves 4, 5, and 6 is the first valve to circuit 24 comprising auxiliary or indicating electric valves 25, 26, and 27 is employed. This arrangement is disclosed and claimed in my copending application above referred to. Electric valves 25, 26, and 27 are associated with main electric valves 4, 5, and 6, respectively, and each is provided with an anode 28, a cathode 29, and a control electrode 30. By means of a voltage divider comprising a resistance 31 which is energized from a direct current source 32, a positive potential is impressed upon the respective anodes 28 of electric valves 25, 26, and 27, by means of a conductor 33, a resistance 34, and an inductive current responsive element 35. The cathodes 29 of electric valves 25, 26, and 27 are connected through a conductor 36 and a lamp 37 to a point of less positive potential on the resistance 31. To control the conductivity of electric valves 25, 26, and 27 in response to a predetermined operating condition of electric valves 4, 5, and 6, a potential is impressed upon the various control electrodes 30 of these valves by suitable current responsive means such as transformers 9, 10, and 11, which are of the magnetic saturable type. The lower terminals of the secondary windings of current transformers 9, 10, and 11 are connected to the negative side of the direct current source 32 by means of a conductor 38. The upper terminals of the secondary windings of transformers 9, 10, and 11 are connected to the control electrodes 30 of electric valves 25, 26, and 27. Connected in series with each of the anode circuits of electric valves 25, 26, and 27 are magnetic saturable voltage transformers 39, 40, and 41, respectively, which are energized through any conventional phase shifting device 42. Connected in parallel with the secondary windings of voltage transformers 39, 40, and 41 are nonlinear resistance elements 39', 40', and 41', which function to introduce in the anode circuits of electric valves 25, 26, and 27 negative voltages of substantially peaked wave form. The nonlinear resistance elements 39', 40', and 41' may be of the material disclosed and claimed in U. S. Patent No. 1,822,742 granted September 8, 1931 on an application of Karl B. McEachron and assigned to the assignee of the present application. A negative voltage is impressed upon the various control electrodes of electric valves 25, 26, and 27 by means of the conductor 38 and through the secondary windings of saturable current transformers 9, 10, and 11, respectively. An electric valve 43, preferably of the vapor electric discharge type, is connected in parallel with the resistance 34 and the current responsive element 35, and is also connected to the direct current source 32 by means of a conductor 44.

The operation of the loss-of-control indicator or circuit 24 will be first explained by considering the translating circuit comprising electric valves 4, 5, and 6 during normal operation.

It will be understood that the electric valves 25, 26, and 27 are normally maintained nonconductive by virtue of the negative potential impressed upon the control electrodes 30 by means of the resistance 31, conductor 38 and the secondary windings of current transformers 9, 10, and 11, respectively. A positive potential is impressed upon the anodes 28 of electric valves 25, 26, and 27 during normal operation of electric valves 4, 5, and 6. That is, when these valves are conducting current positive voltages will be impressed periodically upon the control electrodes 30 of electric valves 25, 26, and 27 by means of current transformers 9, 10, and 11. By means of the phase shifting device 42, which is energized from the alternating current circuit 1, the phase of the negative peaked voltages impressed upon the anodes 28 of electric valves 25, 26, and 27 may be adjusted relative to the positive voltages impressed upon the control electrodes 30 of these valves so that these voltages are in substantial phase coincidence. During normal operation it will be noted that as electric valves 4, 5, and 6 conduct current because of the saturation effects of transformers 9, 10, and 11, a peak of positive voltage will be impressed upon the various control electrodes 30 at the beginning of the respective periods of conduction. However, since the saturable voltage transformers 39, 40, and 41 are adjusted for normal operation to impress negative potentials upon the anodes 28 of electric valves 25, 26, and 27 at precisely the instants at which the positive voltages are impressed upon the control electrodes, the electric valves 25, 26, and 27 will be maintained nonconductive.

If electric valves 4, 5, and 6 conduct current at any time other than during the predetermined periods, or begin to conduct current at any time other than the proper predetermined instants in the respective cycles of operation, it will be noted that the above mentioned phase coincidence between the voltages of transformers 39, 40, and 41 and transformers 9, 10, and 11 will be disturbed. For example, if electric valve 4 conducts at any time other than during the predetermined interval or if electric valve 4 fails to become conductive at the predetermined instants in accordance with its predetermined mode of operation, electric valve 25 will be rendered conductive by virtue of the positive voltage impressed upon the control electrode 30 by current transformer 9. Upon being rendered conductive, electric valve 25 will conduct current to energize the current responsive element 35 from the direct current source 32 and resistance 31 through resistance 34, conductor 33, secondary winding of transformer 39, indicating lamp 37 and conductor 36. Electric valve 43, which is connected to the positive side of the direct current source 32 through conductor 44, will impress upon the respective anodes 28 of electric valves 25, 26, and 27 a potential more positive than that effective prior to conduction by electric valve 25. The effect of such operation, if the additional positive voltage impressed upon the anodes is of sufficient value, will be to render ineffective the alternating negative potentials of peaked wave form impressed upon the various anode circuits by means of the voltage transformers 39, 40, and 41. In other words, after one of electric valves 25, 26, and 27 has been rendered conductive, it will be maintained conductive until the direct current source 32 is disconnected from the circuit 24 by means of a switch 45. The lamp 37, of course, will be energized in response to energization of the indicating circuit 24 to afford an indication that one of the electric valves has lost control or failed to operate according to a predetermined mode of operation. And the electric valve of the group of valves 25, 26, and 27 which is conductive will indicate which of the main electric valves 4, 5, and 6 has been the first to lose control. If electric valves 25, 26, and 27 are of the vapor electric discharge type, the characteristic glow will serve to indicate that the electric valve is conductive. If electric valves of the high vacuum type are utilized, an indicating device responsive to an electrical condition of the electric valve or associated circuit may be employed to indicate the fact that the electric valve is conductive.

It should be understood that after one of the electric valves of the group comprising valves 25, 26, and 27 is rendered conductive, the negative bias voltage impressed upon the control electrodes 30 of the remaining valves is increased to a value less positive than the critical value for these valves so that the remaining valves will be maintained nonconductive even though there are subsequent irregularities in the operation of the main electric valves. This increase in negative bias voltage is occasioned by the increased current flow through the resistor 31.

Although in the above explanation of the operation of the loss-of-control circuit 24 it has been assumed that the circuit operates to afford an indication or to control the translating circuit when one of the main electric valves 4, 5, and 6 fails to become conductive at a predetermined instant in the cycle of operation, it should be further understood that my invention in its broader aspects is also applicable to those arrangements in which it is desired to provide a control or an indication when one of these main electric valves conducts at any time other than during a predetermined interval. This variation in the manner of operation of the control and indicating circuit may be obtained by adjusting the shape of the voltage waves provided by the current transformers 9, 10, and 11 and the shape of the voltage waves provided by the transformers 39, 40, and 41. If it is desirable to afford an indication or to obtain circuit control when the electric valves 4, 5, and 6 conduct at any time other than during a predetermined normal or extended interval, the transformers 39, 40, and 41 may be designed to provide a negative voltage of substantially rectangular wave form having a period of suitable value to meet this requirement. In such a modification, the negative voltages impressed upon the anodes 28 of electric valves 25, 26, and 27 will be effective to maintain these valves nonconductive during predetermined intervals corresponding to and correlated with the normal periods of conduction of the main electric valves 4, 5, and 6.

To provide means for affording an indication when electric valves 4, 5, and 6 fail to conduct within predetermined intervals, I provide a control and indicating circuit 46 which may be termed a failure-to-conduct circuit. The circuit 46 may comprise auxiliary or indicating electric valves 47, 48, and 49, each having an anode 50, a cathode 51 and a control electrode 52. The control valves 47, 48, and 49 are associated with main valves 4, 5, and 6, respectively, to indicate a condition of operation of the latter valves. The anodes 50 of electric valves 47, 48, and 49 have impressed thereon a positive potential from the direct current source 32 by means of a conductor 53, resistance 54, an inductive current responsive element 55, resistance 56, conductor 57, the secondary windings of current responsive means 15, 16, and 17 and conductors 58. Nonlinear resistances 15', 16' and 17' are connected across the secondary windings of current responsive elements 15, 16, and 17. The values of the nonlinear resistances 15', 16' and 17' are chosen so that the output voltage of the current responsive means 15, 16, and 17 impressed upon the respective anodes 50 of electric valves 47, 48, and 49 are of substantially rectangular wave form having a relatively broad characteristic. The current responsive means 15-17 prevent starting of the auxiliary electric valves 47-49 during the actual conducting periods of the respective associated main electric valves 4-6. An electric valve 66 of the vapor electric discharge type is connected in parallel with the serially-connected resistance 56 and the current responsive element 55 to increase the positive potential impressed in the associated anode circuits of control valves 47, 48, and 49 when one of these valves is rendered conductive due to the abnormal operation of the main electric valves 4, 5, and 6. The cathodes 51 of electric valves 47, 48, and 49 are connected to a relatively negative potential point of the resistance 54 by means of an indicating lamp 59 and a conductor 60. A negative potential is impressed upon the control electrodes 52 of electric valves 47, 48, and 49 from the direct current source 32 by means of a conductor 61 and secondary windings of voltage transformers 62, 63, and 64. The transformers 62, 63, and 64 are energized through a conventional phase shifting device 65 to impress positive potentials of peaked wave form on the control electrodes 52 of electric valves 47, 48, and 49 during predetermined intervals corresponding to and correlated with the normal periods of intervals of conduction of the main electric valves 4, 5, and 6. These transformers prevent starting of auxiliary valves 47-49 except during a predetermined interval which may be part or all of the normal conducting period.

The operation of the failure-to-conduct circuit 46 will be first explained by considering the system during normal operation of the main electric valves 4, 5, and 6, that is, when these valves are conducting current during the normal intervals and are being rendered conductive in a predetermined sequence to supply unidirectional current to the load circuit 2. For purposes of explanation, the operation of the indicating and control circuit 46 will be considered in connection with the main electric valve 4. When the electric valve 4 conducts during normal predetermined intervals, the associated control electric valve 47 will be maintained nonconductive. During the period of conduction, the current transformer 15 will impress upon the anode 50 of control valve 47 a negative voltage to render ineffective the positive voltage impressed upon the anode 50 and also to render ineffective the positive voltage impressed upon the control electrode 52 by means of the transformer 62. It will, therefore, be noted that the associated control valve 47 will be maintained nonconductive and the failure-to-conduct circuit 46 will not be operated.

If it be assumed that the main valve 4 fails to conduct during a predetermined interval, the positive voltage impressed upon the anode 50 of the associated control valve 47 from the direct current source 32 will be effective and the control valve 47 will be rendered conductive by the positive potential impressed upon the control electrode 52 by the transformer 62. Upon being rendered conductive, the control electric valve 47 will establish a circuit to energize the indicating lamp 59. This circuit comprises the positive terminal of the direct current source 32, conductor 53, the upper portion of resistance 54, current responsive element 55, resistance 56, conductor 57, secondary winding of current responsive means 15, conductor 58, electric valve 7, indicating lamp 59, conductor 60 and the lower portion of resistance 54. The flow of this current through the current responsive element 55 will render the electric valve 66 conductive to impress upon the associated anode circuits of the control valves 47, 48, and 49 an additional positive potential of sufficient value to render ineffective the negative potential impressed in these circuits by the current responsive means 15, 16, and 17. The electric valve 66 will be maintained conductive and serves the purpose of maintaining the electric valve 47 conductive to effect energization of the indicating lamp 59, thereby maintaining a continuing visual indication of the fact that the translating circuit has experienced an abnormal operating condition. If the control valves 47, 48, and 49 are of the vapor electric discharge type, the characteristic glow of the valves will serve to afford an indication that the valve is conductive and further show that the associated main electric valve has failed to conduct during a predetermined interval. It should be understood that if it is desired, an auxiliary indicating means may be associated with each of the control valves 47, 48, and 49 and may be energized in response to the energization of these valves.

The failure-to-conduct circuit 46 may also be employed to indicate failure of the main electric valves 4, 5, and 6 to become conductive at predetermined instants in the respective cycles of operation. One way in which this may be accomplished is to design the transformers 62, 63, and 64 to provide voltages of peaked wave form of predetermined duration and having substantial phase coincidence with the instants at which each of the main electric valves 4, 5, and 6 is to become conductive. In this manner it will be understood that if the main electric valves 4, 5, and 6 fail to become conductive at the proper instants, the associated control valves 47, 48, and 49 will be rendered conductive by the peak voltages supplied transformers 62, 63, and 64.

The control and indicating circuit 46 is arranged in a manner to indicate the first valve of main electric valves 4, 5, and 6 to fail to conduct within a predetermined interval or to fail to become conductive at predetermined instants in the respective cycles of operation. After one of the electric valves 46, 47, and 48 has been rendered conductive, the other valves of this group will be maintained nonconductive by virtue of the increased negative bias voltage occasioned by the current transfer through the resistance 56, resistance 54 and the lamp 59.

An electric circuit 67 comprising electric valves 68, 69 and 70 is employed to indicate which of the main electric valves 4, 5, and 6 has been the first to experience a reverse current or arc-back condition. The arc-back control and indicating circuit 67 is disclosed and broadly claimed in my copending application Serial No. 61,529, filed January 30, 1936, and assigned to the assignee of the present application. Control valves 68, 69, and 70 are associated with main valves 4, 5, and 6, respectively, to provide an indication of an operating condition of the latter valves. Each of the electric valves 68, 69, and 70 is provided with an anode 71, a cathode 72, and a control electrode 73. A positive potential is impressed upon the various anodes 71 from the direct current source 32 by means of a resistance 74 through conductors 53 and 61. A conductor 75 is utilized to connect the anodes to the positive terminal of resistance 74. To provide means responsive to the direction of current transfer through the main electric valves 4, 5, and 6, I employ saturable reactances 18, 19, and 20, each comprising a magnetizing winding 21 connected in series with electric valves 4, 5, and 6 by conductors 12, 13, and 14, respectively, unidirectional magnetizing means comprising winding 22 energized from the direct current source 32 and a control winding 23. The unidirectional magnetizing windings 22 are provided to saturate the reactors 18, 19, and 20 and are connected to the direct current source 32 through a conductor 75, a resistance 76, an inductance 77, a conductor 78, and a conductor 79. The unidirectional saturating windings 22 of the saturable reactors 18, 19, and 20 are arranged relative to the series connected magnetizing windings 21 so that these windings assist the magnetomotive forces established by the series windings 21 during normal operation of the main electric valves 4, 5, and 6.

The operation of the arc-back indicator 67 will be first considered during the normal operation of the main electric valves 4, 5, and 6. For example, if electric valve 4 conducts current in the normal direction, the associated control electric valve 68 will be maintained nonconductive by virtue of the negative potential impressed upon the control electrode 73 from the negative terminal of the direct current source 32 by means of conductor 61, conductor 79, current directional responsive winding 23, and conductor 80. However, if the main valve 4 conducts current in the reverse direction, this reverse current flowing through the series winding 21 will effect a change in the magnetization of the saturable reactor 18 to induce a voltage in the winding 23 to impress upon the control electrode 73 of control valve 68 a positive potential to render the latter valve conductive, thereby affording an indication that the main valve 4 has experienced an arc-back or reverse current condition. After control valve 68 has been rendered conductive, the negative potential impressed upon the control electrodes of control valves 69 and 70 will be increased to a value less positive than the critical control potential for the particular valve employed, so that these valves will not be rendered conductive even though a subsequent arc-back condition obtains upon main valves 5 and 6, respectively. Upon being rendered conductive, the control valve 68 will effect energization of the indicating lamp 81.

To provide a means for indicating which of the three above described types of irregular operation has been the first to occur, an electric circuit 82 is employed comprising electric valves 83, 84, and 85 energized from the direct current source 32, through conductors 53 and 61, and through a resistance 86. This arrangement is disclosed and claimed in my copending application above referred to. Electric valves 83, 84, and 85 are associated with indicating circuits 24, 46, and 67 respectively. The operation of the circuit 82 is similar to the operation of the circuit 67 described above. Associated with electric valves 83, 84, and 85 are electric lamps 87, 88, and 89, respectively. The electric circuit 82 will indicate which type of failure has been the first to occur since the electric valve 83 is associated with the circuit 24, the electric valve 84 is associated with the electric circuit 46 and the electric valve 85 is associated with electric circuit 67. The electro-responsive element 8 of the circuit interrupter 7 is connected in series with the electric valves 83, 84, and 85 and the associated lamps 87, 88, and 89, respectively, by means of conductors 90 and a switch 91. When it is desired to obtain only an indication of the type of failure which has been the first to occur and when it is not desirable to control the translating circuit in response to the above described failures, the switch 91 may be operated to interrupt the circuit to the electro-responsive element 8 of the circuit interrupter 7.

The general principles of operation of the control and indicating system diagrammatically illustrated in the single figure of the drawing may be best explained by considering the operation of the system under fault conditions of the various natures described above. If it be assumed that the electric valve 4 conducts at any time other than during a predetermined interval or fails to become conductive at predetermined instants, the electric valve 25 in the indicating circuit 24 will be rendered conductive and will be maintained conductive by the electric valve 43 to indicate that the electric valve 4 was the first electric valve to lose control. The lamp 37 will also be energized to indicate that this particular type of fault has occurred. In response to the energization of circuit 24, electric valve 83 of the priority indicating circuit 82 will be rendered conductive, effecting energization of the associated lamp 87. After electric valve 83 has been rendered conductive, the anode-cathode voltage and the control element voltages of the other electric valves of this group will be reduced below the critical voltages for the particular valves used to maintain the other valves of group 82 nonconductive. If electric valves 5 and 6 are subsequently subjected to a fault of a similar nature, that is, if these valves lose control after electric valve 4 has lost control, no indication will be afforded of these occurrences. However, if faults of a different nature occur, such as failure to conduct within a predetermined period or an arc-back condition exists, electric circuits 46 and 67, respectively, will function to afford an indication of the first valve to experience such condition. However, the circuit 82 will not respond to these subsequent failures inasmuch as the function of this circuit is to indicate the occurrence of the first type of failure.

As a further example of the manner in which the indicating system operates, if it be assumed that the electric valve 5 fails to conduct within a predetermined interval or fails to become conductive at predetermined times, the associated electric valve 48 in circuit 46 will be rendered conductive and the electric valve 66 will also be rendered conductive to maintain the circuit condition to afford a continuing indication that the electric valve 5 has failed to conduct within a predetermined interval. In response to this circuit operation, the indicating lamp 59 will be energized to show that a failure of this nature has occurred in the electric valve translating circuit. In response to the operation of circuit 46, the valve 84 of group 82 will be rendered conductive to effect energization of the indicating lamp 88. In the event valves 4, 5, and 6 experience subsequently a loss of control or an arc-back condition, the electric circuits 24 and 67, respectively, will function to provide an indication of the first electric valve to experience the particular type of fault. However, the priority indicating circuit 82 will not respond and will provide only an indication that the first type of abnormal operation to occur was the failure-to-conduct fault previously described in connection with electric valve 5.

As another example, if electric valve 6 of the translating circuit experiences an arc-back or reverse current condition, the electric valve 70 of group 67 will be rendered conductive to effect energization of the indicating lamp 81 to show that this type of failure has occurred in the circuit. In response to this operation, lamp 85 of the priority indicator 82 will be rendered conductive to effect energization of indicating lamp 89. In the manner described above, as the electric valves 4, 5, and 6 experience subsequently faults of a different nature, the electric circuits 24 and 46 will respond to indicate which valve was the first to experience the particular type of fault. These subsequent abnormal circuit operations will not affect the indication provided by the priority indicator 82 which is intended to indicate the first type of fault which has occurred.

It should be understood that by operation of the switch 45 the indicating system may be reset by interrupting the potential applied to the various circuits by the source 32. In the event it is desirable to effect circuit interruption upon the occurrence of the first fault, the switch 91 may be moved to the position in which electro-responsive element 8 is connected in series with the various parallel circuits of the priority indicator 82. When such a circuit connection is arranged, the various circuits, of course, will function to indicate failures in the above described manner until the electric valve translating circuit is opened by circuit interrupter 7.

While I have shown and described my invention as applied to a particular system of connections and as embodying various devices diagrammatically shown, it will be obvious to those skilled in the art that changes and modifications may be made without departing from my invention and I, therefore, aim in the appended claims to cover all such modifications and changes as fall within the true spirit and scope of my invention.

What I claim as new and desire to secure by Letters Patent of the United States, is:

1. In combination, a main electric valve, means for normally rendering it conductive during predetermined intervals and nonconductive during other predetermined intervals, and a circuit responsive to the failure of said electric valve to become conductive during the conductive intervals and comprising an auxiliary electric valve, means for operating said auxiliary electric valve, means to prevent starting of said auxiliary valve during all of said normally nonconductive intervals of said main valve, and means responsive to the current flow in the main valve to prevent starting of said auxiliary valve only during the actual conducting intervals.

2. In combination, electric translating apparatus including a main electric valve, means for rendering said electric valve conductive at predetermined instants, an electric circuit, an auxiliary electric valve connected to effect energization of the electric circuit, means for maintaining said auxiliary valve nonconductive when said main valve becomes conductive at said predetermined instants, and means responsive to the current conducted by said auxiliary valve for controlling said translating apparatus.

3. In combination, electric translating apparatus including a main electric valve, means for rendering said electric valve conductive during predetermined intervals, an electric circuit, a source of current, an auxiliary electric valve for effecting energization of said electric circuit from said source, said auxiliary electric valve having an anode and a cathode, means to prevent starting of said auxiliary valve except during at least a part of said predetermined intervals, means for reducing the voltage applied to said anode below that necessary to maintain an electric discharge in said auxiliary electric valve to prevent starting of said auxiliary valve during the actual conducting intervals of said main electric valve, means for maintaining current through said auxiliary electric valve after it has been rendered conductive, and means for interrupting the current through said auxiliary electric valve.

4. In combination, electric translating apparatus including a main electric valve, means for rendering said electric valve conductive during predetermined intervals, an electric circuit, means for effecting energization of said electric circuit including an auxiliary electric valve, means to prevent starting of said auxiliary valve except during at least a part of said predetermined intervals, and means to prevent starting of said auxiliary valve during the actual conducting intervals of said main electric valve.

5. In combination, electric translating apparatus including a main electric valve, means for rendering said electric valve conductive during predetermined intervals, an electric circuit, means for effecting energization of said electric circuit comprising an auxiliary electric valve having an anode, a cathode and a control electrode, means for impressing upon said control electrode a periodic potential which prevents starting of said auxiliary valve except during at least a part of said predetermined intervals, and means to prevent starting of said auxiliary valve during the actual conducting intervals of said main electric valve.

6. In combination, electric translating apparatus including a main electric valve, means for rendering said electric valve conductive at predetermined times and during predetermined intervals, an electric circuit, means for effecting energization of said electric circuit including an auxiliary electric valve having an anode, a cathode and a control electrode, means for introducing into the anode circuit of said auxiliary valve a potential tending to render said valve conductive, means for impressing upon the control electrode a periodic potential which prevents starting of said auxiliary valve except during at least a part of said predetermined intervals, means for reducing the voltage applied to said anode below that necessary to maintain an electric discharge in said auxiliary valve to prevent starting of said valve during the actual conducting intervals of said main valve, means for maintaining current through said auxiliary electric valve after it has been rendered conductive, and means for interrupting the current through said auxiliary electric valve.

7. In combination, electric translating apparatus including a main electric valve, means for rendering said electric valve conductive at predetermined times, an electric circuit, means for effecting energization of said electric circuit including an auxiliary electric valve having an anode, a cathode and a control electrode, means for introducing into the anode circuit of said auxiliary valve a potential tending to render said valve conductive, means comprising a saturable inductive device for impressing upon said control electrode a periodic voltage of peaked wave form which prevents starting of said auxiliary valve except during the positive peaks, means responsive to the current conducted by said main valve for introducing into the anode circuit of the auxiliary valve a voltage of rectangular wave form which reduces the voltage applied to said anode below that required to maintain an electric discharge to prevent starting of the auxiliary valve during the actual conducting intervals of the main valve, means for maintaining the current through the auxiliary valve after it has been rendered conductive, and means for interrupting the current through the auxiliary valve.

8. In combination, electric translating apparatus including a main electric valve, means for rendering said electric valve conductive during predetermined intervals, an electric circuit, means for effecting energization of said circuit including an auxiliary electric valve having an anode, a cathode and a control electrode, means for impressing a periodic potential on said control electrode to prevent starting of said auxiliary valve except during said intervals, means responsive to the current conducted by said main valve for reducing the anode voltage of said auxiliary valve below that necessary to maintain a discharge to prevent starting during the actual conducting intervals, means responsive to the current conducted by said auxiliary valve to impress on said anode an additional potential to maintain the auxiliary valve conducting after it has been rendered conductive, and means for interrupting the current conducted by said auxiliary valve.

9. In combination, electric translating apparatus including a main electric valve, means for rendering said electric valve conductive during predetermined intervals, an electric circuit, means for effecting energization of said circuit including an auxiliary electric valve having an anode, a cathode and a control electrode, means for impressing a periodic potential on said control electrode to prevent starting of said auxiliary valve except during said intervals, means responsive to the current conducted by said main valve for reducing the anode voltage of said auxiliary valve below that necessary to maintain a discharge to prevent starting during the actual conducting intervals, an electric valve responsive to the current conducted by said auxiliary valve to impress on the anode thereof an additional voltage to maintain the auxiliary valve conducting after it has been rendered conductive, and means for interrupting the currents conducted by said auxiliary valve and said last mentioned valve.

10. In combination, an electric circuit, a plurality of electric valves for energizing said electric circuit and each having an anode, a cathode and a control electrode, a source of direct current, a voltage divider connected across said source for introducing into the anode-cathode circuits of said electric valves a voltage tending to render said electric valves conductive, means for reducing the voltage applied to the anode below that necessary to maintain an electric discharge in the electric valves to prevent starting of said valves during predetermined intervals, means for impressing on said control electrodes periodic voltages tending to render said electric valves conductive during said predetermined intervals, an electric valve responsive to current conducted by said first mentioned valves to impress on the anodes an additional voltage derived from said voltage divider to maintain the first mentioned valves conducting after having been rendered conductive, and means for interrupting the current conducted by said first mentioned electric valves.

BURNICE D. BEDFORD.